Patented Sept. 24, 1946

2,408,296

UNITED STATES PATENT OFFICE 2,408,296

PROCESS OF RECLAIMING RUBBER

Frank Harriss Cotton, East Barnet, and Percy Albert Gibbons, London, England; said Gibbons assignor to said Cotton No Drawing. Application August 13, 1943, Serial No. 498,576. In Great Britain July 3, 1942

8 Claims. (Cl. 260—720)

This invention relates to a process of reclaiming rubber. The objects of the invention are to achieve a more rapid plasticisation of vulcanised rubber and a more complete recovery from vulcanised rubber waste by a more rapid process than heretofore with fewer steps and less machinery. Subsidiary aims of the invention are to conserve materials by converting the textile fibres frequently associated with vulcanised rubber into a finely dispersed compounding ingredient.

This invention includes a process of reclaiming rubber from vulcanised rubber goods including composite material containing vulcanised rubber and fabric (like used tyre covers) which consists in treating the material in pieces to heat and to frictional agitation with grinding and shredding in a closed vessel with a controlled quantity of oxygen, air or other autoxidation promoter sufficient to allow only the initial desirable autoxidation to proceed and to ensure softening of the vulcanised rubber, the temperature of the mass being raised to the region of 180°–300° C. and preferably to within the neighbourhood of 220° C., after which the softened mass is subjected to the calendering and like processes customary with raw rubber.

Preferably the pieces of material to be treated are subjected to preliminary heating to about 150° C. to 190° C. This may be done by direct steam heating or it may be done by heating first in hot water and thereafter in a closed steam pan. Preliminary heating is unnecessary when the raw material is in the form of ground waste vulcanised rubber.

It is a feature of this invention that the proportion of oxygen, air or other autoxidation promoter present when the pieces are being subjected to preliminary heating and are later being subjected to frictional agitation and heat is carefully controlled to avoid resinification of the rubber while ensuring the desired softening.

This invention also includes a process as indicated above in which there is added to the material under treatment a catalytic softening agent such as phenylhydrazine, thiophenol, aldol-α-naphthylamine, aldol-β-naphthlamine, mercaptobenzthiazole, xylyl mercaptan, or naphthyl-β-mercaptan, which catalytic agent, while the rubber is in a state of mechanical stress, accelerates that desirable form of oxygen attack which causes softening of the rubber but helps to suppress the secondary form of oxidation which leads to resinification or perishing of the rubber. These softening agents are known as peptizers, as this term is described, for example, in Industrial Chemistry, 1935, volume 27, page 1317 et seq., "Hydrazines as rubber softeners"; and they will be so denominated in the subjoined claims.

According to a subsidiary feature of this invention, at the later stages of the grinding and heating operation (or alternatively at an early stage of the grinding and heating operation) there may be added to the softened material a solid pulverulent powder of the nature of a filler which is absorbed by the rubber first softened and which thereby assists in the grinding and softening of any unplasticized particles of vulcanised rubber that may be present.

In carrying the present invention into effect, the tyres or other forms of rubber scrap are first inspected, and sorted into grades, and large stones, nails, metal and other foreign materials are removed by hand or by mechanical means. Pneumatic tyre casings are freed from metal either by cutting off the beads or otherwise.

The tyres or other forms of waste rubber are then cut into suitable sections for subsequent mechanical treatment. Thus pneumatic tyre casings are conveniently cut by large shears into sections from 2 to 12 or more inches in length according to the capacity and mechanical strength of the grinding machine described later. The cut tyre sections or other forms of waste rubber may then be tipped into a tank of water preferably at 80° to 90° C., and maintained at that temperature by waste steam from the next part of the process.

When warmed through, the tyre sections or other forms of waste vulcanised rubber are fed to a steam pan or steam-jacketed autoclave preferably fitted with one or more boltless quick-operating doors. Therein the waste rubber, which may or may not contain cotton fabric, is heated to about 150° C.–190° C., by live steam. This part of the process serves two objects, viz., firstly, to reduce the strength of the vulcanised rubber and cotton, thereby lessening the strain it will impose on the grinding machine used in the next stage; secondly, to ensure a high temperature at the beginning of the next operation, so that the desired maximum temperature may be reached as quickly as possible. The steam exhausted from the pan during this operation goes to heat the water employed at the previous stage. The preliminary step of heating in hot water may be omitted if desired.

The hot tyre sections or other forms of waste rubber complete with cotton fabric, if any, are discharged directly through a chute or via a conveyor belt to a large internal mixer of the Bridge-Banbury, Shaw Intermix, Baker-Perkins Universal, or other similar type, suitably modified, fitted with two rotors and used in the rubber industry for mixing rubber compounds and grinding waste rubber.

In such known machines it is the usual practice to cool the mixing cylinder, the rotors and other parts of these machines by means of water; but in this process the jacket, rotors, etc., are heated by means of high temperature steam, super-heated water, diphenyloxide or other medium to a temperature of 130° C.–160° C. or higher, cooling being reduced to a minimum by lagging the jacket and all parts lending themselves to this protection. Alternatively the mixing chamber may be raised to the requisite temperature by preliminary working of a batch or by direct heating. Within the mixer, the hot waste rubber is subjected under heat to the mechanical stress resulting from grinding and mixing; a small controlled quantity of oxygen or air or other oxygenating gas is admitted in order to bring about desired softening of the vulcanised rubber without causing undesired resin-formation. Directly the hot waste rubber begins to grind in the heated internal mixer, friction between the rubber and the moving parts of the machine, and internal friction in the rubber and fabric itself, causes rapid rise of temperature to a peak between 190° and 250° C. depending upon the type of waste, the efficiency of the machine employed and the conditions of the processing. With improved methods of heating and of precaution against heat losses, peaks beyond this range may be expected.

Subjection of the vulcanised rubber to mechanical stress during heating greatly activates it towards oxygen attack and it begins quickly to soften. Any residual moisture is driven off, and is allowed to escape from the grinding machine.

The attainment of the peak temperature within the mixer indicates the approach of the end of effective grinding. It is usually found that at this stage some at least of the rubber has markedly softened, most if not all of the textile fabric (if present) has disintegrated, but a proportion of the rubber may be left as discrete particles in a plastic matrix.

With many types of waste vulcanised rubber it is desirable, though not essential, to introduce into the mixer, for example along with the pieces of tyre or other rubber scrap, a small quantity of a catalytic softening agent or peptizer which serves: (a) to simulate the desired form of oxygen attack which leads to plasticisation of the vulcanised rubber, and (b) to help to suppress subsequent undesirable oxidation. The most suitable catalyst yet found is phenyl hydrazine which may be used in for example the proportion of 0.05% to 1.0% according to the nature of the raw material. Other catalysts are thiophenol, aldol-α-naphthylamine, aldol-β-naphthylamine, mercaptobenzthiazole, xylyl mercaptan and naphthyl-β-mercaptan. Several autoxidation catalysts and reducing agents may be employed together. The introduction of a reducing gas such as sulphur dioxide or an inert gas such as carbon dioxide, steam or the decomposition products of ammonium carbonate, may have advantage in assisting to suppress undesirable resin-forming oxidation during the latter stages of the grinding and mixing process.

At or near to the stage at which peak temperature is reached in the mixer, a proportion of a dry powder such as gas-black, soot, china clay, light magnesium carbonate, kieselguhr, commercial silica, or whiting may be added. The powder may with advantage be preheated. This powder is rapidly absorbed by the rubber first softened (e. g. the friction and skim-coat rubber of a tyre carcase), with which it forms a tough mix. This tough mix immediately begins to work with more effective friction than the softened rubber could previously exert, against any unplasticised vulcanised rubber particles. The temperature in the mixer again rises, and in a short time the mix is found to be substantially homogeneous.

The amount and nature of the dry powder requisite at this stage is dependent upon the toughness and degree of ageing of the initial vulcanised rubber. In general the finer the particle size of the filler the greater its effect in causing internal friction and heat; the older and softer the vulcanised waste employed the less powder has been found necessary. Quantities up to 30% on the weight of the original scrap have been successfully employed with tough tyres. The total period of grinding and plasticising varies with the charge and also with the age of the vulcanised rubber under treatment, but is of the order of 30 minutes.

In a somewhat similar way simultaneous reclamation and compounding may be effected by introducing into the mass of waste rubber in the mixing chamber and at the appropriate moment the fillers or other material desired to be compounded with the reclaim. This is particularly applicable to such cases as the preparation of ebonite stock directly from waste vulcanised rubber and scrap ebonite, both in the form of large pieces.

The material is discharged from the internal mixer in a plastic condition (preferably after the addition of a little water, 1%–3% just before discharge or spraying with water to cool—by latent heat or steam—and to protect the rubber against rapid oxidation and possible inflaming) and may be immediately sheeted and simultaneously refined on closely set rolls such as those of the type commonly used in refining reclaimed rubber made by the alkali process. Where the presence of metallic or other solid impurities makes this necessary the plastic material may be readily forced through a strainer of the worm extruder or hydraulic extruder type. The resulting reclaimed rubber is preferably scraped from one of the rolls in the form of a thin leaf or sheet by means of a robust doctor blade pressed against the roller. The thinly sheeted reclaimed rubber may then be rolled, layer upon layer, upon a rotating drum from which it can later be cut in the form of large rectangular sheets. These sheets may be dusted with talc or china clay to reduce surface tackiness. The sheeting rolls may be enclosed in a casing to which can be fed steam or an inert or reducing gas in order to suppress local surface oxidation of the hot plastic mass.

The process of the present invention is illustrated by the following examples.

EXAMPLE 1

The treads were removed from a large number of tyres and cut into sections each weighing 2–4 lbs. 110 lbs. of this waste tread were weighed into two perforated iron kettles and the latter charged into a well-lagged steam pan.

The door was closed by means of bolts and the waste rubber raised to a temperature of 174° C. by introducing superheated steam at the highest pressure available, viz. 80 lbs. per square inch. At the end of 30 minutes the pressure of steam in the pan was rapidly released and the pan opened as quickly as possible.

The hot and dry scrap was transferred immediately to the inner chamber of a No. 3 "Bridge-Banbury" internal mixer. In continuous production every precaution would be taken to ensure maximum temperature of the waste and minimum heat losses during the transfer from pan to mixer.

The chamber of the internal mixer, contrary to the usual practice, had been raised to as high a temperature as possible by directing steam under pressure into the walls, rotors, and sliding door. Various devices were employed to raise and maintain the temperature of the mixing chamber.

The No. 3 "Bridge-Banbury" mixer has a feed hopper above the mixing chamber and connected thereto by a vertical rectangular throat in which slides a "floating weight" coupled by a vertical piston rod to a piston in a pneumatic cylinder above the hopper. The downward pressure on the floating weight may be about 60–80 lbs. per square inch. The floating weight moves up and down during the mixing and exercises a pumping action. The floating weight acts as a confining door for the contents of the mixer.

The hot, dry and softened sections of waste tread were rapidly reduced to a ground mass and exposed to the action of a controlled amount of air introduced into the mixing chamber during the process by the pumping action of the floating weight, this air being the small amount which enters around the weight due to the loose fit of the latter in the throat and fills the available space in the mixing chamber. With the latter fairly fully charged (as indicated in the examples set forth in the present specification) and with the customary action of the apparatus, the air entering will contain oxygen amounting to a fraction of one per cent of the rubber by weight—usually less than 0.40 per cent. Largely due to the friction ensured by the air pressure of 60 lbs. per square inch on the floating weight, the temperature rose during this stage from 140° to the neighbourhood of 220° C. The relation between the temperature recorded at the socket and the actual temperature of the mass of waste rubber was determined by discharging the stock at a known steady socket temperature and observing the temperature of the hot stock by means of thermometers plunged into deep incisions made in the soft mass. As the result of shredding and grinding at high temperature whilst exposed to the action of a limited supply of oxygen, the waste rubber plasticised and at the end of a period not exceeding 30 minutes in any of the test runs performed, the waste was discharged in the form of large plastic lumps similar in appearance to a compounded carbon black rubber stock.

During the tests a number of methods were employed to prevent undesirable oxidation occurring when the very hot reclaimed rubber was discharged from the mixer, the addition of a little water just before discharge being found the most effective by cooling and simultaneous production of steam.

The plastic mass was passed through a sheeting mill and then transferred immediately to the tight nip of a two-roll mill of the type normally employed in the rubber industry, the rolls being hot and geared to friction speeds. The reclaimed scrap immediately formed a thin film round the faster roll and after four passes was deflected by means of a doctor blade on to a revolving drum and built up into sheets approximately one inch thick. The finished reclaim was then cut lengthwise, stripped from the drum and dusted with clay or talc to remove surface tackiness.

In appearance, texture and odour it was difficult to distinguish the product from reclaim prepared by old established methods.

EXAMPLE 2

A number of test runs were made for which the general procedure was the same as that described in Example 1. A small quantity of a catalytic softening agent or peptizer was added to the hot mass in the mixing chamber and was found to aid the process of plasticisation, reducing the time necessary in the mixing chamber and the working on the leafing mills; the "tailings" or unreclaimed particles were softer and the proportion of them much reduced. The quantity of peptizer necessary did not exceed 1%, a quarter of this giving most satisfactory results.

The peptizers employed were phenylhydrazine, xylyl mercaptan and mercaptobenzthiazole.

In the course of these tests the addition of 0.1 to 0.3% ammonium carbonate was found to be useful in suppressing undesirable oxidation during the actual mastication process, the advisability or otherwise of such protection being indicated by the character of the odour arising from the mixer.

EXAMPLE 3

In this test 100 lbs. of large sections of debeaded whole tyres were charged into the steam pan, the finished reclaim containing the whole of the decomposed fabric as a finely dispersed compounding ingredient. The procedure was similar to that described in Examples 1 and 2 with the following modifications:

Best results were obtained by the addition of 0.5% of phenylhydrazine to the mass early in the process and 0.3% of ammonium carbonate towards the end to counteract the increased tendency to undesirable oxidation possibly due to the fairly high proportion of fabric present.

Although the temperature reached was somewhat lower than in Example 1, viz. 210° C., the plastic mass discharged gave an excellent thin film of reclaim at the first pass through the leafers.

A yield of 90% of first grade reclaim was obtained, the greater part of the remaining 10% serving as a useful second grade reclaim.

EXAMPLE 4

For this test 120 lbs. of cable strippings were cut into long lengths and subjected to the same procedure as described in Examples 1 and 2 with the following modifications:

As the waste was in the form of tubes of relatively thin section the period of preliminary heating in the pan was reduced to 20 minutes. It is a feature of the process that during the processing the temperature of the waste in the mixer passes through a maximum and this, together with the massing indicated by the thumping of the floating weight, serves as a guide to the completion of the test. It was found possible with cable strippings to reduce the period in the mixer to 20 minutes. There was every indication that with the achievement of higher initial temperatures and a more rapid rise the period in the mixer could be appreciably reduced in all cases. The resulting plastic mass sheeted well at the first pass and the second gave a reclaim comparable in appearance with any prepared by other processes.

A yield of 88% of first grade reclaim was obtained, the balance forming a useful second grade.

With heavy cables it was found that the addition of 0.2% of catalytic softening agent aided the plasticisation process and gave a softer product, which could be processed with greater ease.

The temperature of the cable-strippings in the pan was in the neighbourhood of 170° C. and in the mixer 200° C.

EXAMPLE 5

115 lbs. of whole red pneumatic tyre inner tubes without metal valves were charged into the pan and exposed to steam at 171° C. for 20 minutes. The procedure then followed that described in Examples 1 and 2, the plastic mass being discharged from the mixer at the end of 24 minutes. The temperature reached in the mixer was in the neighbourhood of 210° C.

The resulting plastic mass give a thin nervy sheet on the leafers and an 84% yield of reclaim excellent in appearance after three passes. The bulk of the remaining 16% served as a useful second grade reclaim.

The addition of a very small quantity, 0.1%, of catalytic softening agent aided the process of plasticisation but was not essential.

EXAMPLE 6

A series of test runs was made employing 120 lbs. of bicycle inner tubes for each charge. The maximum temperatures reached in the mixer ranged between 190° and 220° C.

After the initial period of warming in the pan it was found possible to complete the process in the mixer in periods of less than 17 minutes.

In all cases an excellent nervy reclaim was obtained readily, the product being strikingly similar to masticated raw crepe rubber in its behaviour on the sheeting mill. The inclusion of a small proportion of catalytic softening agent, e. g. 0.2% of phenylhydrazine, led to a very soft stock being obtained. The vulcanized product was similar to that obtained in the absence of the catalytic softening agent save that it showed a somewhat lower modulus.

Refining was unnecessary with reclaim prepared by this process from bicycle inner tubes. This applies equally to gas mask faces and similar waste rubbers. The yield was almost 100%.

EXAMPLE 7

A small internal mixer was used for the test runs represented by this example. The raw material was ground waste tyre tread and no preliminary heating was performed. 2600 grams of the cold ground waste was charged into the mixing chamber of a small internal mixer capable of accommodating a maximum of 3200 grams of the like waste. The initial temperature of the mixer was 152° C. The temperature fell as the cold waste was introduced and then rose to the neighbourhood of 190–200° C. as the grinding proceeded, full air pressure of 80 lbs. per square inch being applied to the floating weight.

A sample was removed at the end of 10 minutes and although this sheeted and indicated some measure of reclamation it was by no means complete.

Pure oxygen was then conducted from a reservoir in which it was under a pressure of 40 atmospheres to the mass of waste via a tube in the wall of the mixing chamber. Although the amount of oxygen entering represented 1% by weight on the waste rubber, only a relatively small amount of this came into actual contact with the waste under the conditions of the experiment.

Almost immediately the ground mass merged into a plastic mass, shown by the movement of the weight piston, and the temperature rose rapidly by about 10° C. At the end of 15 minutes a plastic mass was discharged which gave an excellent film of reclaim at the first pass. The whole process from cold ground waste to the finished rolls of nervy reclaim occupied only 20 minutes. The yield amounted to almost 100%.

EXAMPLE 8

2,000 grams of a blended batch of debeaded whole tyres cut into sections each weighing 150–250 grams were placed on a metal grid and lowered into a steam jacketed pan. The lid was bolted down and the waste rubber raised to a temperature of 176° C. by means of high pressure steam (115–125 lbs. per square inch) to which the waste tyre sections were exposed for 30 minutes. A free flow of steam through the pan in the first instance removed the air present.

At the end of this period the pressure of steam in the inner pan was rapidly released, the pan opened as quickly as possible and the hot dry waste transferred to an internal mixer heated by the methods described in the foregoing examples.

The temperatures of the mixing chamber rose from 142° C. to the neighbourhood of 190° C. at the end of 14 minutes. At this point 100 grams (5%) of hot carbon black of fine particle size and high reinforcing properties was introduced in two equal portions into the mass of waste rubber. The grinding effect increased and the temperature rose rapidly to the neighbourhood of 200° C. As customary in all these examples a controlled amount of air was admitted to the mixing chamber during the process. 1.0% of phenylhydrazine was added, 0.75% with the hot waste and 0.25% with the carbon black. The best result was obtained using these proportions but a much lower proportion would be sufficiently effective.

Experience has shown that better results are obtained when the addition of carbon black is done more gradually over an extended period of time, better dispersion and grinding action being thus achieved.

When the plastic mass was discharged at the end of 30 minutes and transferred to the tight nip of a two-roll mill, a thin smooth sheet of reclaim with a matt finish and entirely free from evidence of fibre was obtained. It was extremely easy to handle on the mill and very easily rolled, sheeted and plied. "Tailings," i. e. unreclaimed particles, were largely reduced.

Similar results were obtained using such fillers as the china clays of fine particle size of the type represented by the proprietory product "Stockalite," kieselguhr and light magnesium carbonate; with the last named, a much greater stiffening effect was observed leading to increased friction by more thorough grinding and the maintenance of the plasticised scrap at its maximum temperature for longer periods.

EXAMPLE 9

1000 grams of sections of debeaded whole tyre and 1500 grams of ebonite scrap in large broken pieces were heated to a temperature of 174° C. by exposure for 30 minutes to high pressure steam, as previously described, and transferred immediately to the hot chamber of the internal mixer.

The temperature rose from 145° C. to the neighbourhood of 205° C. at 10 minutes and a plastic mass was discharged at the end of 19 minutes.

Very good dispersion of ground ebonite throughout the mass of the reclaimed whole tyre had been achieved although small particles, easily broken by grinding, could be observed.

When transferred to the leafer the compound showed a marked tendency to roll in the nip and give a rough sheet of mixed reclaim and dispersed ground ebonite.

The stock was made up into mixes, the proportion of added sulphur being based on the rubber hydrocarbon content of the reclaimed whole tyre only. Sheets were press cured at 141° C. for various periods according to the vulcanising characteristics of the mix.

Sheets of ebonite of good quality were obtained without difficulty. These were examined by two ebonite manufacturers and pronounced very satisfactory.

Simultaneous reclamation and compounding of waste rubber and ebonite scrap was thus achieved by the new process in less than an hour, no initial preparation of either scrap being necessary beyond the cutting of the whole tyre into sections.

Tests have been made on representative samples of reclaim obtained by the process of this invention, the results of which are given below. In these tests, the following mixes were employed the figures being parts by weight:

|  | A | B |
|---|---|---|
| Smoked sheet rubber | 35.45 |  |
| Reclaim | 40.00 | 100.0 |
| Zinc oxide | 2.50 |  |
| Carbon black | 17.65 |  |
| Stearic acid | 1.70 |  |
| "Nonox X" antioxidant | .60 |  |
| Sulphur | 1.75 | 5.0 |
| Mercaptobenzthiazole | .35 |  |
|  | 100.00 | 105.0 |

The results obtained using particular specimens of reclaim will now be given, preceded in each case by a description and analysis of the specimen of reclaim used.

1. TYRE TREAD RECLAIM

Specific gravity _____ 1.16
Ash _____ 10.2
Acetone extract _____ 9.6
Chloroform extract _____ 15.8

Cure

|  | A<br>25 mins.<br>@ 141° C. | B<br>15 mins.<br>@ 141° C. | A | B |
|---|---|---|---|---|
|  |  |  | Aged samples 11 days @ 70° C. | |
| Tensile strength (lbs. per square inch) | 2,480 | 600 | 2,400 | 600 |
| Elongation at break (per cent) | 550 | 300 | 360 | 100 |
| Modulus (at 300% elongation) | 1,400 |  | 2,000 |  |

2. WHOLE TYRE RECLAIM (INCLUDING FABRIC AS COMPOUNDING INGREDIENT)

Specific gravity _____ 1.23
Ash _____ 14.4
Acetone extract _____ 9.9
Chloroform extract _____ 21.3

Cure

|  | A<br>25 mins.<br>@ 141° C. | B<br>35 mins.<br>@ 141° C. | A | B |
|---|---|---|---|---|
|  |  |  | Aged samples 11 days @ 70° C. | |
| Tensile strength (lbs. per square inch) | 2,000 | 420 | 1,800 | 760 |
| Elongation at break | 510 | 150 | 300 | 50 |
| Modulus at 300% | 1,040 |  | 1,800 |  |

3. RECLAIM FROM CABLE STRIPINGS

Specific gravity _____ 1.39
Ash _____ 35.3

Cure

|  | A<br>25 mins.<br>@ 141° C. | B<br>35 or 25 mins.<br>@ 141° C. | A | B |
|---|---|---|---|---|
|  |  |  | Aged samples 11 days @ 70° C. | |
| Tensile strength (lbs. per square inch) | 2,500 | 660 or 540 | 2,220 | 760 | 680 |
| Elongation at break | 500 | 330 or 380 | 330 | 100 | 130 |
| Modulus at 300% | 1,200 | 640 or 460 | 2,000 |  |  |

An indication of the good ageing properties of reclaims prepared by the process of this invention is given by the retention of tensile properties after ageing for 11 days at 70° C.

Processing tests made on the reclaim have yielded the following data:

(a) *The mixing mill.*—The reclaim is easily handled on cold or slightly warm rolls. It becomes tacky and difficult to remove if the rolls are hot and on a tight nip transfers immediately to the back roll. On opening the nip and cooling the rolls it can be readily removed; this is facilitated by the addition of a small proportion of crude rubber.

(b) *Compounding.*—The reclaim mixes very readily with crude rubber and materially aids the dispersion of added fillers. Mixing time is reduced.

(c) *Extruding.*—Uncompounded reclaim extrudes readily and smoothly. Compounded with proportions of "Witbro," a vulcanised oil type of rubber substitute, smooth tubes of large diameter were extruded with less difficulty than standard stocks for extrusion. The machine should be maintained just warm.

(d) *Moulding.*—Compounded with sulphur only or in a fully loaded mix the reclaim stocks moulded readily, flow in the mould being facilitated by the character of the reclaim. Soft rubber vulcanisates and ebonites were prepared which compared favourably with those prepared from similar mixes containing crude rubber and no reclaim.

We claim:

1. A process of reclaiming rubber from vulcanized rubber scrap, which comprises subjecting a quantity of pieces of scrap material in substantially dry form to intense mechanical action in a heated internal mixer, in the presence of oxygen amounting to a fraction of one per cent by weight of the scrap material, for a period of from about ten minutes to about thirty minutes until the temperature of the mass rises, as a result of such action, to a peak of between about 190° C. to about 250° C.; discharging the rubber; and quenching the same at about the same moment to cool and protect it against rapid oxidation.

2. A process of reclaiming rubber from vulcanized rubber scrap containing textile fibers, which comprises subjecting a quantity of the scrap material in substantially dry form to intense mechanical action in a heated internal mixer, in the presence of oxygen amounting to a fraction of one per cent by weight of the scrap material, for a period of from about ten minutes to about thirty minutes until the temperature of the mass rises, as a result of such action, to a peak at between about 190° C. and about 250° C., a plastic mass is produced, and the fiber has disintegrated into fine particles which are imperceptible in the mass; discharging the rubber; and quenching the same at about the same moment to cool and protect it against rapid oxidation.

3. A process of reclaiming rubber from vulcanized rubber scrap, which comprises subjecting a quantity of the scrap material in substantially dry form to intense mechanical action in a heated internal mixer; in the presence of oxygen amounting to a fraction of one per cent by weight of the scrap material, until the temperature of the mass rises, as a result of such action, to a peak at between about 190° C. and about 250° C.; adding a solid pulverulent filler at approximately the stage at which peak temperature is reached; continuing the mechanical action until the temperature in the mixer again rises and a substantially homogeneous mix is formed; discharging the rubber; and quenching the same at about the same moment to cool and protect it against rapid oxidation.

4. A process of reclaiming rubber from vulcanized rubber scrap containing textile fibers, which comprises subjecting a quantity of scrap material to a preliminary heating to a temperature of from about 150° C. to about 190° C. by live steam; exhausting the steam; immediately subjecting the mass in substantially dry form to intense mechanical action in a heated internal mixer, in the presence of a small amount of oxygen not exceeding about one per cent by weight of the scrap material, until the temperature of the mass rises, as a result of such action, to a peak at between about 190° C. and about 250° C., a plastic mass is produced, and the textile fiber has disintegrated into fine particles which are imperceptible in the mass; discharging the rubber; and quenching the same at about the same moment to cool and protect it against rapid oxidation.

5. A process of reclaiming rubber from vulcanized rubber scrap, which comprises subjecting a quantity of the scrap material in substantially dry form to intense mechanical action in a heated internal mixer, in the presence of oxygen amounting to a fraction of one per cent by weight of the scrap material, for a period of from about ten minutes to about thirty minutes until the temperature of the mass rises, as a result of such action, to a peak at between about 190° C. and about 250° C.; creating a non-oxidizing atmosphere in the mixer during the latter stages of the grinding process; discharging the rubber; and quenching the same at about the same moment to cool and protect it against rapid oxidation.

6. A process of reclaiming rubber from vulcanised scrap which comprises subjecting a quantity of the scrap material in substantially dry form to intense mechanical action in a heated internal mixer in the presence of oxygen, amounting to a fraction of one per cent by weight of the scrap, for a period of from about ten minutes to about thirty minutes until the temperature of the mass rises as the result of such action to a peak at between about 190° C. and about 250° C., discharging the rubber; and quenching the same at about the same moment to cool and protect it against rapid oxidation.

7. A process of reclaiming rubber from vulcanized rubber scrap, which comprises subjecting a quantity of the scrap material to a preliminary heating to a temperature of from about 150° C. to about 190° C. by live steam; exhausting the steam; immediately subjecting the mass in substantially dry form to intense mechanical action in a heated internal mixer, in the presence of a small amount of oxygen not exceeding about one per cent by weight of the scrap material, until the temperature of the mass rises, as a result of such action, to a peak at between about 190° C. and about 250° C.; discharging the rubber; and quenching the same at about the same moment to cool and protect it against rapid oxidation.

8. A process of reclaiming rubber from vulcanized rubber scrap which comprises subjecting a quantity of the scrap material in substantially dry form to intense mechanical action in a heated internal mixer in the presence of oxygen, amounting to a fraction of one per cent by weight of the scrap, and together with a small quantity of a peptizer, until the temperature of the mass rises as the result of such action to a peak at between about 190° C. and about 250° C.; discharging the rubber; and quenching the same at about the same moment to cool and protect it against rapid oxidation.

FRANK HARRISS COTTON.
PERCY ALBERT GIBBONS.